United States Patent [19]
Fan et al.

[11] Patent Number: 4,728,459
[45] Date of Patent: Mar. 1, 1988

[54] TUNGSTEN-CONTAINING ZINC SILICATE PHOSPHOR

[75] Inventors: Albert K. Fan; Vincent Chiola, both of Towanda, Pa.

[73] Assignee: GTE Products Corporation, Stamford, Conn.

[21] Appl. No.: 664,198

[22] Filed: Oct. 24, 1984

Related U.S. Application Data

[63] Continuation-in-part of Ser. No. 252,100, Apr. 8, 1981, abandoned.

[51] Int. Cl.$^4$ ............................................. C09K 11/38
[52] U.S. Cl. ............................. 252/301.5; 252/301.6 F
[58] Field of Search ...................... 252/301.6 F, 301.5

[56] References Cited

U.S. PATENT DOCUMENTS 2,309,676  2/1943  Schmidling ................ 252/301.5 X
3,114,067  12/1963  Henderson ................ 252/301.5 X
3,939,377  2/1976  Ignasiak .................. 252/301.4 S

FOREIGN PATENT DOCUMENTS 2450435  4/1976  Fed. Rep. of Germany ... 252/301.5

OTHER PUBLICATIONS

Hurd et al., "J. of Vacuum Science and Technology", vol. 13, No. 1, pp. 410–413, 1976.
Vehara et al., "J. Chem. Soc. Japan", 61, pp. 907–918, (1940).

Primary Examiner—Jack Cooper
Attorney, Agent, or Firm—James Theodosopoulos

[57] ABSTRACT

A manganese-activated zinc silicate phosphor contains a small amount of tungsten dispersed throughout the phosphor matrix. The tungsten improves maintenance of a fluorescent lamp in which the phosphor is used.

3 Claims, No Drawings

TUNGSTEN-CONTAINING ZINC SILICATE PHOSPHOR

This is a continuation in part of Ser. No. 252,100, filed Apr. 8, 1981, now abandoned.

BACKGROUND OF THE INVENTION

This invention is concerned with manganese-activated zinc silicate phosphor, $Zn_2SiO_4$:Mn. The phosphor emits in the green region of the visible spectrum and is used, for example, in fluorescent lamps and cathode ray tubes. $Zn_2SiO_4$:Mn is disclosed in U.S. Pat. Nos. 2,109,984; 2,206,280; 2,210,087; 2,222,509; 2,241,939; 2,245,414; 2,247,142; 2,544,999; and 3,416,019.

One of the problems with $Zn_2SiO_4$:Mn is its relatively poor fluorescent lamp maintenance. That is to say, the light output, or lumens per watt, of the phosphor decreases to a greater extent during lamp life than is desirable. This invention is concerned with a manganese-activated zinc silicste phosphor having improved maintenance.

SUMMARY OF THE INVENTION

This invention discloses a manganese-activated zinc silicate phosphor containing a small quantity of tungsten. The effect of the tungsten is to improve lamp maintenance. Lamp brightness is also generally increased as a result.

The tungsten is added together with other raw materials which are well blended and then fired to form the phosphor. Thus the tungsten is dispersed throughout the phosphor matrix instead of, say, being present only at about the surface of the phosphor particle. The tungsten may be added in elemental or compound form.

DESCRIPTION OF THE PREFERRED EMBODIMENTS

Example I

A 2.5 kilogram stoichiometric mixture of raw materials was made by blending 1627.6 grams of silicon dioxide ($SiO_2$), 730.2 grams of zinc oxide (ZnO), and 144.3 grams of manganese carbonate ($MnCO_3$). The assay of the $SiO_2$ was 87.26% and of the Mn 46.32%; thus, the mole ratio of the ingredients was 2 to 1.0609 to 0.1217, respectively.

Thorough blending was accomplished by first vigorously shaking the component raw materials in a plastic container, followed by hammermilling of the mixture, and finally vigorously shaking the hammermilled mixture in a plastic container.

A control phosphor, i.e., not containing tungsten, was made by firing 700 g of this mixture in a 6½" high by 5½" ID crucible.

A phosphor embodying the invention, i.e., containing tungsten admixed with the raw materials, was made by blending another 700 g of the mixture with 1.667 g (0.242 mole %) of tungsten which was added as fine particle size tungsten trioxide ($WO_3$). Blending was accomplished by vigorously shaking the ingredients in a plastic container on a paint shaker type apparatus for a minimum of 30 minutes. The tungsten-containing blend was then loaded into a 6½ high by 5 ½ ID crucible for firing.

Both crucibles were fired in a programmable gas-fired furnace according to a schedule of: (a) placing loaded crucibles in the furnace at 750° C.; (b) raising the temperature from 750° C. to 1350° C. at a rate of 400° C./hour; (c) holding the crucibles at a temperature of 1350° C. for 6 hours; (d) lowering the temperature to 750° C. at a rate of 400° C./hour; and (e) holding the crucible at 750° C. for 10 hours. The fired materials were removed from the furnace and permitted to cool to room temperature.

The phosphors were then removed from the crucibles and separately milled in vibratory mills for 1 hour, using 2-liter polyurethane-lined stainless steel mills each containing 1000 milliliters of 0.1% citric acid solution and a normal loading of ½"×½" OD alumina milling media. The phosphors were then separated from the milling media, washed, filtered, oven dried and sifted through a 200-mesh screen. The finished phosphors were then tested in 40 watt, 4' fluorescent lamps along with a prior art commercially used phosphor, specifically, a nonstoichiometric $Zn_2SiO_4$:Mn phosphor, GTE type 2282. The results are as follows:

| Phosphors | 0 hr. lumens | LPW | 100 hr. lumens | LPW | % Maintenance |
| --- | --- | --- | --- | --- | --- |
| Tungsten-containing | 4449 | 112.9 | 4200 | 106.6 | 94.4 |
| Control | 4180 | 106.1 | 3914 | 98.3 | 93.6 |
| Type 2282 | 4502 | 115.7 | 3992 | 101.8 | 88.0 |

It can be seen that the tungsten-containing phosphor had better maintenance at 100 hour than either the control phosphor or the prior art phosphor. The tungsten-containing phosphor was also significantly better in 100 hour lumen output than the other two. The test was continued to 500 hours for the tungsten-containing phosphor and the type 2282 phosphor, the test on the control phosphor being discontinued because the 100 hour lumens were too low. At 500 hours, the respective light outputs for the two phosphors, i.e., the tungsten-containing phosphor and the prior art phosphor, were 3684 and 3303 lumens. The respective maintenances were 82.8% and 73.4%. Thus the tungsten-containing phosphor had a 500 hour maintenance 9.4 units better than the prior art phosphor.

EXAMPLE II

Next, a 15 kilogram stoichiometric batch was prepared by blending the same raw materials as before in the same ratio. The raw materials were tumble-blended in a 24 gallon drum for 1½ hours, then passed through a hammermill and reblended in a drum tumbler for ½ hour.

Four individual 700 gram samples (A, B, C and D) of this blend were weighed out and three of them were intimately mixed with the following respective amounts of tungsten trioxide powder: 0.8, 1.2 and 1.6 grams, which are equivalent to 0.116, 0.174 and 0.232 mole percent of tungsten. The samples were fired in an electric furnace at 1260° C. for six hours, then removed and allowed to cool to room temperature.

In preparation for a second step firing, the cakes were broken up by rolling, and were then blended with 0.12% by weight $BaCl_2$ as a flux. The materials were then reloaded into crucibles and refired in an electric furnace for three hours at 960° C. The temperature was then adjusted to 830° C. and the crucibles were held at 830° for eight hours.

On completion of second step firing, each sample was milled for one hour in a vibratory mill using approximately 1.0 liters of 0.1 weight % aqueous citric acid solution and alumina milling media as before. The milled phosphors were then filtered, washed several times with deionized water, dried and sieved through a 200-mesh screen The finished phosphors were then tested in 40 watt, 4'fluorescent lamps along with the prior art type 2282 phosphor. The results are a follows:

| Phosphor | W Content, mole % | 0 Hr. lumens | LPW | 100 hr. lumens | LPW | % Maintenance |
|---|---|---|---|---|---|---|
| 2282 | 0 | 4494 | 113.2 | 4087 | 102.7 | 90.7 |
| A | 0 | 4272 | 108.4 | 3999 | 101.2 | 93.4 |
| B | 0.116 | 4754 | 119.4 | 4489 | 111.9 | 93.7 |
| C | 0.174 | 4674 | 117.7 | 4434 | 111.1 | 94.4 |
| D | 0.232 | 4642 | 117.2 | 4422 | 110.8 | 94.5 |

It can be seen that the tungsten-containing phosphors (samples B, C and D) had better maintenance at 100 hours than either of the non-tungsten-containing phosphors type 2282 and sample A. Also, the tungsten-containing phosphors had higher brightness (0 hour lumens).

EXAMPLE III

In this example, samples were made on a production size drum scale of 65 kilograms, in contrast to the laboratory size scale of the previous examples. Also, the formulations were nonstoichiometric with respect to silicon dioxide. In addition, postfire washing and milling using citric acid, as was done in the previous examples, was eliminated; the normal production postfire processing, i.e., hammermilling only, was used.

For the control batch representing standard production zinc silicate phosphor, a 65 kg batch of raw materials, nonstoichiometric with respect to silicon dioxide, was made by intimately blending 41.754 kg of zinc oxide (ZnO), 19.813 kg of silicon dioxide (91.59% assay) and 3.702 kg of manganous carbonate (46.33% Mn). ZnO, $SiO_2$, and $MnCO_3$ were in the mole ratio 2.0 to 1.1778 to 0.1217. In addition, 0.241 kg of the usual mixture of arsenous oxide, zinc oxide and lead fluoride was included in the blend as is normal practice in making zinc silicate. Said mixture contains 0.289 wt % arsenous oxide ($As_2O_3$), 27.45 wt % lead fluoride ($PbF_2$), with the remainder a zinc oxide and silicon dioxide.

The tungsten-containing phosphor was made as follows. A 65 kg batch of raw materials was made with the same mole ratio of ZnO, $SiO_2$ and $MnCO_3$ as was used in making the control. In addition 0.068 kg (0.108 mole %) of tungsten trioxide powder was included in the blend while the usual arsenous oxide, zinc oxide, lead-oxide mixture was eliminated. The mole ratio of ZnO, $SiO_2$, $MnCO_3$ and $WO_3$ was 2.0 to 1.1778 to 0.1217 to 0.00115.

Both batches were fired at 1254°–1260° C. in crucibles for six hours. The fired cakes were broken up and hammermilled, and the powder was blended with 0.12% $BaCl_2$. The materials were second-step fired for 3 hours at 960° C., then held at 830° C. for 8 hours. Final cakes were broken up and hammermilled only.

The phosphors were evaluated in fluorescent lamps as before. The results are a follows:

| Phosphor | 0 hr. lumens | LPW | 100 hr. lumens | LPW | Percent Maintenance |
|---|---|---|---|---|---|
| Without tungsten | 4491 | 112.0 | 4044 | 101.1 | 90.3 |
| Tungsten-containing | 4736 | 117.8 | 4345 | 107.5 | 91.3 |

It can be seen that the tungsten-containing phosphor had higher brightness and better maintenance than the control phosphor.

EXAMPLE IV

In this example, material from Example III was used, but with different firing schedules. Samples E and F were fired at 1350° C., using the same firing procedure as in Example I. Samples G and H were two-step fired, using the procedure of Example II. The results in fluorescent lamp tests are as follows.

| Phosphor Sample | Tungsten Content Mole % | 0 hr. lumens | LPW | 100 hr. lumens | LPW | Percent Maintenance |
|---|---|---|---|---|---|---|
| E | 0 | 4580 | 113.4 | 4281 | 106.5 | 93.9 |
| F | 0.115 | 4590 | 113.6 | 4342 | 107.5 | 94.6 |
| G | 0 | 4428 | 111.8 | 4090 | 102.5 | 91.7 |
| H | 0.115 | 4678 | 117.0 | 4371 | 109.3 | 93.4 |

As can be seen, the tungsten-containing phosphors have higher brightness and better maintenance than the control phosphors which do not contain tungsten.

We claim:

1. A manganese-activated zinc silicate phosphor containing tungsten dispersed throughout the phosphor matrix.

2. The phosphor of claim 1 wherein the amount of tungsten is about 0.05 to 0.3 mole percent.

3. A manganese-activated zinc silicate phosphor containing tungsten dispersed throughout the phosphor matrix, the amount of tungsten being sufficient to improve lamp maintenance of a fluorescent lamp in which the phosphor is used.

* * * * *